United States Patent
Chen et al.

(10) Patent No.: US 10,312,806 B1
(45) Date of Patent: Jun. 4, 2019

(54) VOLTAGE CONVERTER FOR SIMULATING INDUCTOR CURRENT CONTROL

(71) Applicant: ANPEC ELECTRONICS CORPORATION, Hsinchu (TW)

(72) Inventors: Chih-Yuan Chen, Hsinchu (TW); Zhan-Zhe Huang, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/030,075

(22) Filed: Jul. 9, 2018

(30) Foreign Application Priority Data

Feb. 2, 2018 (TW) .............................. 107103842 A (51) Int. Cl.
*H02M 3/156* (2006.01)
*H02M 1/08* (2006.01)
*H02M 1/00* (2006.01)

(52) U.S. Cl.
CPC ............ *H02M 3/156* (2013.01); *H02M 1/08* (2013.01); *H02M 2001/0009* (2013.01); *H02M 2003/1566* (2013.01)

(58) Field of Classification Search
CPC ........... H02M 2001/0009; H02M 1/08; H02M 3/156; H02M 2003/1566
See application file for complete search history.

(56) References Cited

U.S. PATENT DOCUMENTS

| 8,018,212 | B1* | 9/2011 | Petricek | .............. | H02M 3/1582 |
| | | | | | 323/259 |
| 2007/0053115 | A1* | 3/2007 | Tain | ........................ | G05F 1/575 |
| | | | | | 361/18 |
| 2007/0210782 | A1* | 9/2007 | Prexl | .................... | H02M 3/1582 |
| | | | | | 323/288 |
| 2009/0108820 | A1* | 4/2009 | Mirea | .................... | H02M 3/156 |
| | | | | | 323/271 |
| 2010/0085028 | A1* | 4/2010 | Moussaoui | ........... | H02M 3/157 |
| | | | | | 323/284 |
| 2011/0074373 | A1* | 3/2011 | Lin | ........................ | H02M 3/156 |
| | | | | | 323/282 |
| 2013/0293204 | A1* | 11/2013 | Lu | ........................ | H02M 3/1582 |
| | | | | | 323/234 |
| 2013/0335054 | A1* | 12/2013 | Pigott | .................... | H02M 3/1588 |
| | | | | | 323/311 |
| 2016/0105110 | A1* | 4/2016 | Houston | ............ | H02M 3/1582 |
| | | | | | 323/271 |
| 2018/0248481 | A1* | 8/2018 | Couleur | .............. | H02M 3/1584 |

FOREIGN PATENT DOCUMENTS

| TW | 201223088 A1 | 6/2012 |
| TW | 201729526 A | 8/2017 |

\* cited by examiner

*Primary Examiner* — Jue Zhang
*Assistant Examiner* — David A. Singh
(74) *Attorney, Agent, or Firm* — Li & Cai Intellectual Property (USA) Office (57) ABSTRACT

The present disclosure provides a voltage converter for simulating inductor current control, which simulates an inductor current of a power level circuit according to operation signals generated by a control circuit, an input voltage, and an output voltage, thereby achieving detection of the inductor current by using a non-sensing method. Therefore, compared to a conventional sensing method, the voltage converter of the present disclosure can reduce use of a sensing circuit to reduce costs, and an inductor current ramp generated thereby has no distortion. Accordingly, the voltage converter of the present disclosure can improve the accuracy of inductor current detection.

8 Claims, 8 Drawing Sheets

VOLTAGE CONVERTER FOR SIMULATING INDUCTOR CURRENT CONTROL

CROSS-REFERENCE TO RELATED PATENT APPLICATION

This U.S. Non-provisional Application for Patent claims benefits of the priority of Taiwan patent application serial no. 107103842, filed on Feb. 2, 2018. The entirety of the above-mentioned patent application is hereby incorporated by reference herein and made as a part of this specification.

BACKGROUND

Technical Field

The present disclosure relates to a voltage converter, and in particular, a voltage converter for simulating inductor current control.

Description of Related Art

In system power management, voltage converters are often used to provide different levels of operating voltage. An ideal voltage converter is capable of providing a stable output voltage and a wide-range output current so that an output voltage can still be stabilized at an original voltage level and quickly provide a corresponding load current when a load changes instantaneously, thereby efficiently converting the voltage.

Figure 1:
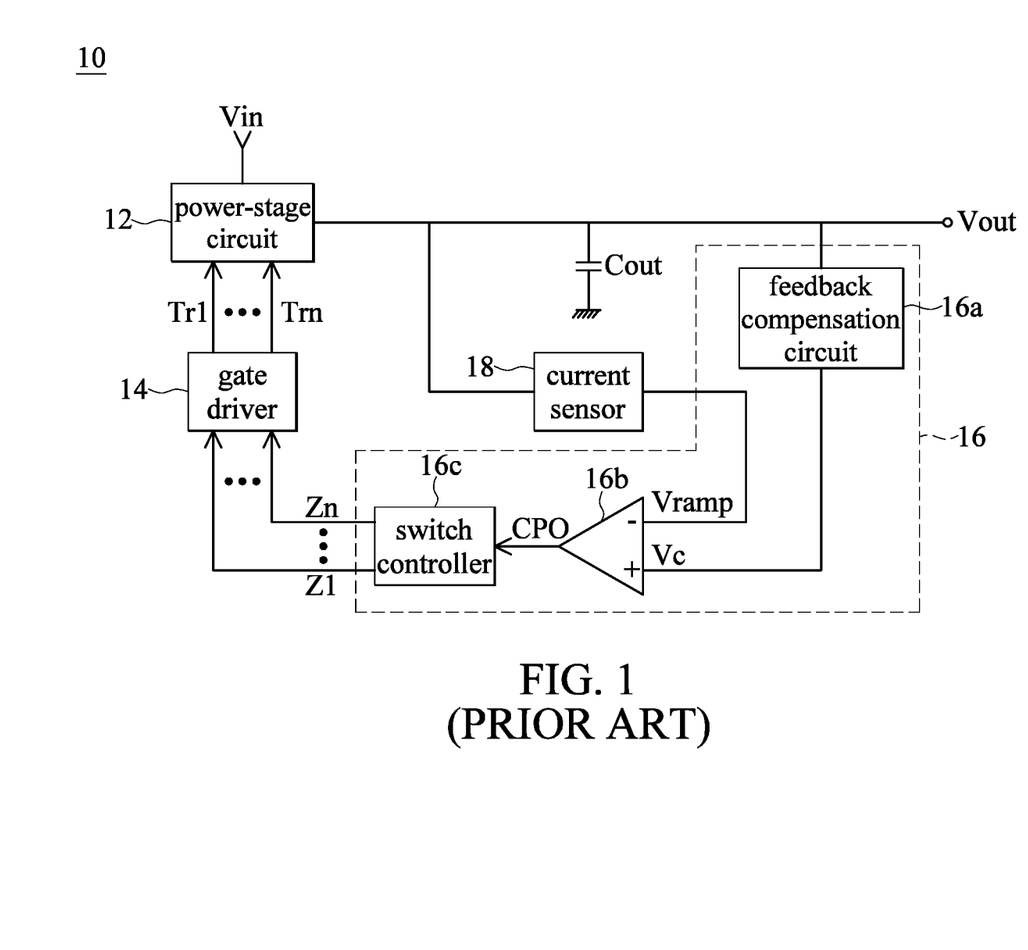
FIG. 1 shows a schematic diagram of a conventional voltage converter for simulating inductor current control.

There are many types of voltage converters, for example, buck converters, boost converters, buck-boost converters, etc. FIG. 1 shows a schematic diagram of a conventional voltage converter. As shown in FIG. 1, a voltage converter 10 is used to convert an input voltage Vin to an output voltage Vout to drive a load (represented by a load capacitor Cout). The voltage converter 10 includes a power level circuit 12, a gate driver 14, a control circuit 16, and a current sensor 18. The current sensor 18 is coupled to the power level circuit 12 and detects an inductor current (not shown in the drawings) flowing through an inductor in the power level circuit 12 to generate a ramp signal Vramp indicating the inductor current.

The control circuit 16 is coupled to the power level circuit 12 and the current sensor 18. More specifically, the control circuit 16 includes a feedback compensation circuit 16a, a comparator 16b, and a switch controller 16c. The feedback compensation circuit 16a generates a feedback error signal Vc related to the output voltage Vout. The comparator 16b generates a comparison result CPO according to the feedback error signal Vc related to the output voltage Vout and the ramp signal Vramp indicating the inductor current. The switch controller 16c generates a plurality of operation signals Z1-Zn according to the comparison result CPO.

The gate driver 14 is coupled between the control circuit 16 and the power level circuit 12. The gate driver 14 respectively converts the operation signals Z1 to Zn into a plurality of gate driving signals Tr1 to Trn to periodically control each switch element (not shown in the drawings) of the power level circuit 12, to further charge or discharge the inductor (not shown in the drawings) in the power level circuit 12, and thereby to generate a required load current and the stable output voltage Vout.

However, the current sensor 18 detects the inductor current by using a direct sensing method, which causes a physical distortion during conversion (i.e., a signal conversion from current to voltage). Consequently, the ramp signal Vramp indicating the inductor current would be inaccurate, which may lead to erroneous actions during the control process. Therefore, as the voltage converter can detect the inductor current by using a non-sensing method, the voltage converter would not cause a distortion and would improve the accuracy of inductor current detection.

SUMMARY

An objective of the present disclosure is to provide a voltage converter for simulating inductor current control, which simulates an inductor current of a power level circuit according to operation signals generated by a control circuit, an input voltage, and an output voltage, thereby achieving detection of the inductor current by using a non-sensing method. The voltage converter of the present disclosure can reduce use of sensing circuits to reduce costs. An inductor current ramp generated thereby has no distortion compared to the conventional sensing method and can improve the accuracy of inductor current detection. In addition, the conventional sensing method can be limited by conditions in actual application (e.g., variations of sensing impedance), causing the accuracy to decrease.

An exemplary embodiment of the present disclosure provides a voltage converter for simulating inductor current control. The voltage converter is used to convert an input voltage into an output voltage. The voltage converter includes a power level circuit, a gate driver, a control circuit, and a inductor current ramp generator. The power level circuit has a high-side switch, a low-side switch, and an inductor. The high-side switch is coupled to the low-side switch and the inductor. The gate driver is coupled to the power level circuit, and periodically controls the high-side switch and the low-side switch according to a plurality of operation signals to charge or discharge the inductor. The gate driver generates the output voltage according to an inductor current flowing through the inductor. The control circuit is coupled between the power level circuit and the gate driver. The control circuit generates a feedback error signal related to the output voltage, and generates the operation signals according to the feedback error signal and a ramp signal related to the inductor current. The inductor current ramp generator is coupled to the control circuit and the power level circuit. When the gate driver drives the power level circuit to charge the inductor, the inductor current ramp generator increases the ramp signal according to one of the operation signals, the input voltage and the output voltage, to simulate the inductor current. When the gate driver drives the power level circuit to discharge the inductor, the inductor current ramp generator decreases the ramp signal according to one of the operation signals and the output voltage, to simulate the inductor current.

An exemplary embodiment of the present disclosure provides a voltage converter for simulating inductor current control. The voltage converter is used to convert an input voltage into an output voltage. The voltage converter includes a power level circuit, a gate driver, a control circuit, and a inductor current ramp generator. The power level circuit has a first switch, a second switch, a third switch, a fourth switch, and an inductor. An end of the inductor is coupled between the first switch and the second switch, and another end of the inductor is coupled between the third switch and the fourth switch. The gate driver is coupled to the power level circuit. The gate driver periodically controls the first switch, the second switch, the third switch, and the fourth switch according to a plurality of operation signals to charge or discharge the inductor in a buck mode or in a boost mode. The gate driver generates the output voltage according to an inductor current flowing through the inductor. The control circuit is coupled between the power level circuit and the gate driver. The control circuit generates a feedback error signal related to the output voltage and generates the operation signals according to the feedback error signal and a ramp signal related to the inductor current. The inductor current ramp generator is coupled to the control circuit and the power level circuit. When the gate driver drives the power level circuit in the buck mode to charge the inductor, the inductor current ramp generator increases the ramp signal according to one of the operation signals controlling the first switch and the second switch, the input voltage and the output voltage, to simulate the inductor current. When the gate driver drives the power level circuit in the buck mode to discharge the inductor, the inductor current ramp generator decreases the ramp signal according to one of the operation signals controlling the first switch and the second switch, the input voltage and the output voltage, to simulate the inductor current. When the gate driver drives the power level circuit in the boost mode to charge the inductor, the inductor current ramp generator decreases the ramp signal according to one of the operation signals controlling the third switch, the fourth switch and the input voltage to simulate the inductor current. When the gate driver drives the power level circuit in the boost mode to discharge the inductor, the inductor current ramp generator increases the ramp signal according to one of the operation signals controlling the third switch, the fourth switch, the input voltage and the output voltage, to simulate the inductor current.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. However, the concepts of the present disclosure can be embodied in many different forms, and shall not be construed as being limited by the exemplary embodiments illustrated in this disclosure. Wherever possible, the same reference numbers are used in the drawings and the description to refer to the same or like parts.

The present disclosure provides a voltage converter for simulating inductor current control, which simulates an inductor current flowing through an inductor of a power level circuit by a inductor current ramp generator, thereby achieving detection of the inductor current by using a non-sensing method. More specifically, when the voltage converter is a buck converter or a boost converter, the power level circuit has two switch elements. The inductor current ramp generator simulates the inductor current flowing through the inductor according to operation signals controlling two switch elements, an input voltage, and an output voltage. When the voltage converter is a buck-boost converter, the power level circuit has four switch elements. The inductor current ramp generator simulates the inductor current flowing through the inductor according to operation signals controlling four switch elements, the input voltage, and the output voltage in a buck mode or in a boost mode. Therefore, the voltage converter of the present disclosure can reduce use of sensing circuits to reduce costs. The inductor current ramp generated thereby has no distortion compared to the conventional sensing method and can improve the accuracy of detecting the inductor current. In addition, the conventional sensing method may be limited by conditions in actual application (e.g., variations of sensing impedance) to cause the accuracy to be decreased. The voltage converter of the present disclosure simulates the inductor current control and is not limited by actual application conditions. The voltage converter for simulating inductor current control provided in the exemplary embodiment of the present disclosure will be described in the following paragraphs.

Figure 2A:
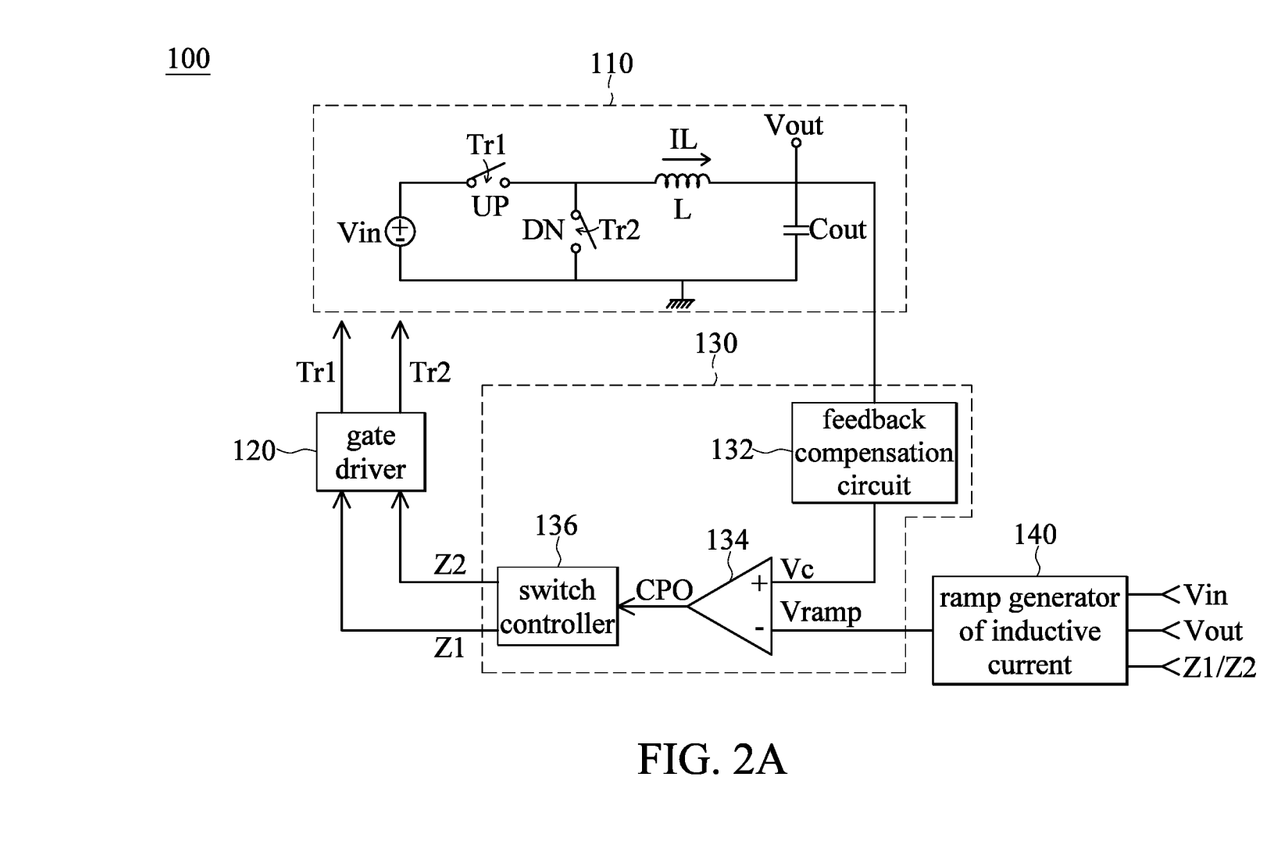
FIG. 2A shows a schematic diagram of a buck converter according to an embodiment of the present disclosure.

Referring to FIG. 2A, which shows a schematic diagram of a buck converter according to an embodiment of the present disclosure. As shown in FIG. 2A, a voltage converter 100 is used to convert an input voltage Vin into an output voltage Vout to drive a load (represented by a load capacitor Cout). The voltage converter 100 includes a power level circuit 110, a gate driver 120, a control circuit 130, and a inductor current ramp generator 140. The power level circuit 110 has a high-side switch UP, a low-side switch DN, and an inductor L. The high-side switch UP is coupled to the low-side switch DN and the inductor L. More specifically, the power level circuit 110 of the present disclosure is a power level circuit of a buck converter. Therefore, an end of the high-side switch UP receives the input voltage Vin and another end of the high-side switch UP connects to ground through the low-side switch DN. The inductor L is coupled between the high-side switch UP and the low-side switch DN. The output voltage Vout lower than the input voltage Vin is generated by an inductor current IL flowing through the inductor L.

The gate driver 120 is coupled to the power level circuit 110. The gate driver 120 periodically controls the high-side switch UP and the low-side switch DN according to operation signals Z1 and Z2 to charge or discharge the inductor L of the power level circuit 110. Then, the output voltage Vout is generated by the inductor current IL flowing through the inductor L. More specifically, the gate driver 120 respectively converts the operation signals Z1 and Z2 into gate driving signals Tr1 and Tr2 to respectively control the high-side switch UP and the low-side switch DN to be turned-on or turned-off so that the output voltage Vout lower than the input voltage Vin is generated by the inductor current IL. For example, the gate driver 120 turns on the high-side switch UP and turns off the low-side switch DN according to the operation signals Z1 and Z2 to charge the inductor L. The gate driver 120 turns off the high-side switch UP and turns on the low-side switch DN according to the operation signals Z1 and Z2 to discharge the inductor L.

The control circuit 130 is coupled between the power level circuit 110 and the gate driver 120. The control circuit 130 generates a feedback error signal Vc related to the output voltage Vout and generates the operation signals Z1 and Z2 according to the feedback error signal Vc and a ramp signal Vramp related to the inductor current IL. More specifically, the control circuit 130 includes a feedback compensation circuit 132, a comparator 134, and a switch controller 136. The connection relationships and implementations of the feedback compensation circuit 132, the comparator 134, and the switch controller 136 in the control circuit 130 are generally the same as those of a feedback compensation circuit 16a, a comparator 16b, and a switch controller 16c in a conventional control circuit 16, and the detailed descriptions will be omitted herein.

A difference between the prior art and the present disclosure is that, in the present disclosure, the ramp signal Vramp related to the inductor current IL is generated by the inductor current ramp generator 140. The inductor current ramp generator 140 is coupled to the control circuit 130 and the power level circuit 110. The inductor current ramp generator 140 receives one of the operation signals Z1 and Z2, the input voltage Vin and the output voltage Vout to simulate the inductor current IL flowing through the inductor L.

Figure 2B:
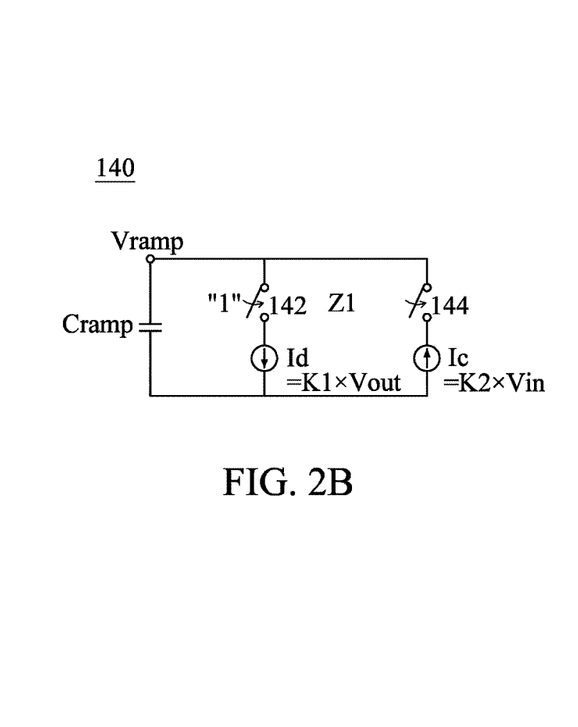
FIG. 2B shows a schematic diagram of a inductor current ramp generator of FIG. 2A.
Figure 2C:
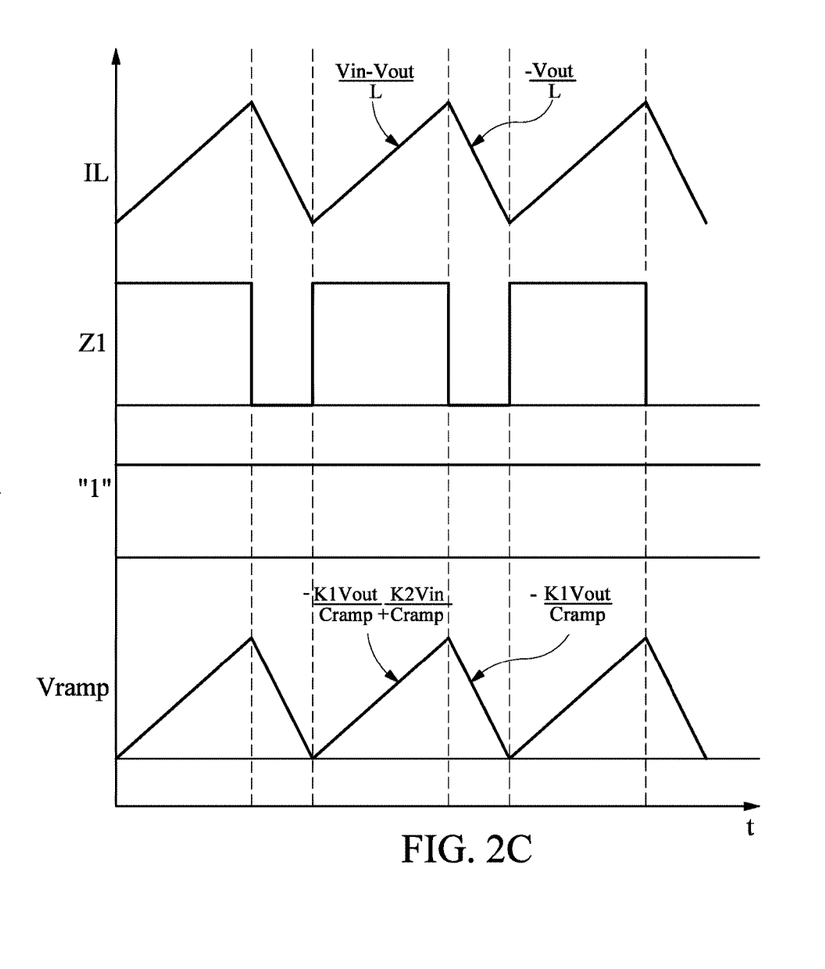
FIG. 2C shows an oscillogram of simulating the inductor current of FIG. 2A.

Reference is made to an oscillogram of the inductor current IL and the ramp signal Vramp shown in FIG. 2C. When the gate driver 120 drives the power level circuit 110 to charge the inductor L, the inductor current IL flowing through the inductor L increases. At this time, the inductor current ramp generator 140 increases the ramp signal Vramp according to one of the operation signals Z1 and Z2, the input voltage Vin, and the output voltage Vout to simulate the inductor current IL. When the gate driver 120 drives the power level circuit 110 to discharge the inductor L, the inductor current IL flowing through the inductor L decreases. At this time, the inductor current ramp generator 140 decreases the ramp signal Vramp according to one of the operation signals Z1 and Z2 and the output voltage Vout to simulate the inductor current IL.

More specifically, as shown in FIGS. 2B and 2C, the inductor current ramp generator 140 includes a discharging switch 142, a charging switch 144, a discharging current source, a charging current source, and a capacitor Cramp. The discharging switch 142 connects in series with the discharging current source. A discharging current Id of the discharging current source is related to the output voltage Vout with a first rate K1, i.e., Id=K1*Vout. The charging switch 144 connects in series with the charging current source. A charging current Ic of the charging current source is related to the input voltage Vin with a second rate K2, i.e., Ic=K2*Vin. The capacitor Cramp is connected in parallel to the discharging current source and the charging current source. The discharging current Id is opposite to the charging current Ic.

When the gate driver 120 drives the power level circuit 110 to charge the inductor L, the inductor current IL increases. At this time, the discharging switch 142 maintains conduction according to a high-level, the charging switch 144 conducts according to one of the operation signals Z1 and Z2. The charging current source (i.e., Ic=K2*Vin) charges the capacitor Cramp (i.e., the energy is (K2*Vin)/Cramp) and the discharging current source (i.e., Id=K1*Vout) discharges the capacitor Cramp (i.e., the energy is (K1*Vout)/Cramp) to generate the ramp signal Vramp to the control circuit 130.

It is worth noting that the discharging switch 142 can maintain conduction according to a high-level generated by the voltage converter 100 or an external circuit, but is not limited hereto. The charging switch 144 can conduct according to one of the operation signal Z1 and Z2. In the present disclosure, the charging switch 144 conducts according to the operation signal Z1. The operation signals Z1 and Z2 are reverse signals. Therefore, when the charging switch 144 conducts according to the operation signal Z2, the charging switch 144 can reverse the operation signal Z2 to produce the operation signal Z1.

As shown in FIG. 2C, the ramp signal Vramp increases according to the energy of the capacitor Cramp, and the ramp signal Vramp is:

$$Vramp = \frac{-(K1 \times Vout)}{Cramp} + \frac{(K2 \times Vin)}{Cramp}$$

If the first rate K1 matches the second rate K2 (i.e., K=K1=K2), the ramp signal Vramp can be derived as:

$$Vramp = \frac{-(K1 \times Vout)}{Cramp} + \frac{(K2 \times Vin)}{Cramp}$$

In addition, when the gate driver 120 drives the power level circuit 110 to discharge the inductor L, the inductor current IL decreases. At this time, the discharging switch 142 maintains conduction according to the high-level, and the charging switch 144 cuts off according to one of the operation signals Z1 and Z2. The discharging current source (i.e., Id=K1*Vout) discharges the capacitor Cramp (i.e., the energy is (K1*Vout)/Cramp) to generate the ramp signal Vramp to the control circuit 130.

At this time, the ramp signal Vramp decreases according to the energy of the capacitor Cramp and the ramp signal Vramp is:

$$Vramp = \frac{K}{Cramp}(Vin - Vout)$$

If the first rate K1 matches the second rate K2 (i.e., K=K1=K2), the ramp signal Vramp can be derived as:

$$Vramp = \frac{-(K1 \times Vout)}{Cramp}$$

Accordingly, when the gate driver 120 drives the power level circuit 110 to charge the inductor L, the inductor current IL increases. The ramp signal Vramp generated from the inductor current ramp generator 140 may simulate an increase of the inductor current IL. When the gate driver 120 drives the power level circuit 110 to discharge the inductor L, the inductor current IL decreases. The ramp signal Vramp generated from the inductor current ramp generator 140 may also simulate a decrease of the inductor current IL.

Accordingly, the voltage converter 100 can simulate the inductor current IL flowing through the inductor L of the power level circuit 110 by using the inductor current ramp generator 140, thereby achieving detection of the inductor current IL by using a non-sensing method.

Figure 3A:
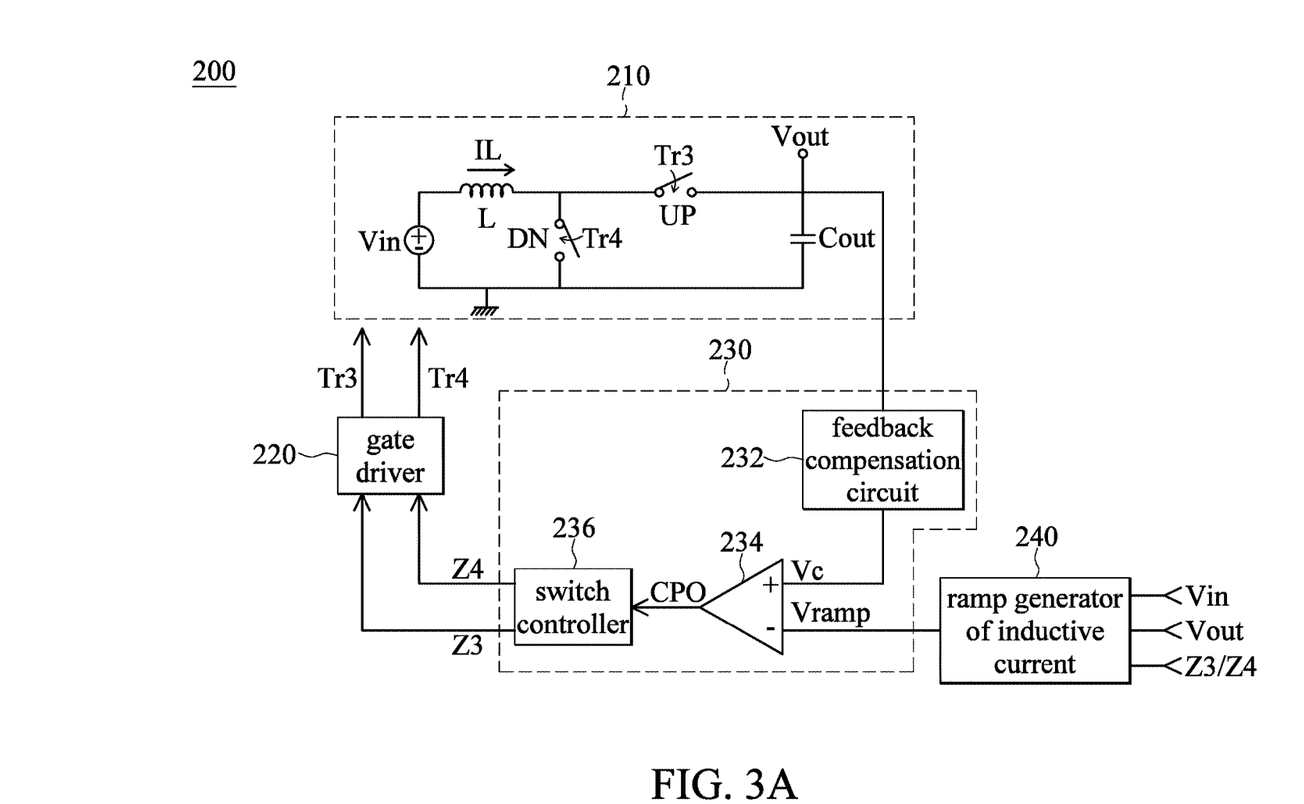
FIG. 3A shows a schematic diagram of a boost converter according to an embodiment of the present disclosure.

Reference is made to FIG. 3A, which shows a schematic diagram of a boost converter according to an embodiment of the present disclosure. As shown in FIG. 3A, a voltage converter 200 is used to convert the input voltage Vin into the output voltage Vout to drive a load (represented by a load capacitor Cout). The voltage converter 200 includes a power level circuit 210, a gate driver 220, a control circuit 230, and a inductor current ramp generator 240. The power level circuit 210 has a high-side switch UP, a low-side switch DN, and an inductor L. The high-side switch UP is connected to low-side switch DN and the inductor L. More specifically, the power level circuit 210 of the present disclosure is a power level circuit of a boost converter. Therefore, an end of the inductor L receives the input voltage Vin and another end of the inductor L is coupled between the high-side switch UP and the low-side switch DN. The output voltage Vout higher than the input voltage Vin is generated by the inductor current IL flowing through the inductor L.

The gate driver 220 is coupled to the power level circuit 210. The gate driver 220 periodically controls the high-side switch UP and the low-side switch DN according to operation signals Z3 and Z4 to charge or discharge the inductor L of the power level circuit 210. Then, the output voltage Vout is generated by the inductor current IL flowing through the inductor L. More specifically, the gate driver 220 respectively converts the operation signals Z3 and Z4 into gate driving signals Tr3 and Tr4 to control the high-side switch UP and the low-side switch DN to be turned-on or turned-off, so that the output voltage Vout higher than the input voltage Vin is generated by the inductor current IL. For example, the gate driver 220 turns off the high-side switch UP and turns on the low-side switch DN according to the operation signals Z3 and Z4 to charge the inductor L. The gate driver 220 turns on the high-side switch UP and turns off the low-side switch DN according to the operation signals Z3 and Z4 to discharge the inductor L.

The control circuit 230 is coupled between the power level circuit 210 and the gate driver 220. The control circuit 230 generates a feedback error signal Vc related to the output voltage Vout and generates the operation signals Z3 and Z4 according to the feedback error signal Vc and a ramp signal Vramp related to the inductor current IL. More specifically, the control circuit 230 includes a feedback compensation circuit 232, a comparator 234, and a switch controller 236. The connection relationships and implementations of the feedback compensation circuit 232, the comparator 234, and the switch controller 236 in the control circuit 130 are generally the same as those of the feedback compensation circuit 16a, the comparator 16b, and the switch controller 16c in the conventional control circuit 16, so that detailed descriptions are omitted herein.

A difference between the prior art and the present disclosure is that, in this embodiment, the ramp signal Vramp related to the inductor current IL is generated by the inductor current ramp generator 240. The inductor current ramp generator 240 is coupled to the control circuit 230 and the power level circuit 210. The inductor current ramp generator 240 receives one of the operation signals Z3 and Z4, the input voltage Vin and the output voltage Vout to simulate the inductor current IL flowing through the inductor L.

Figure 3B:
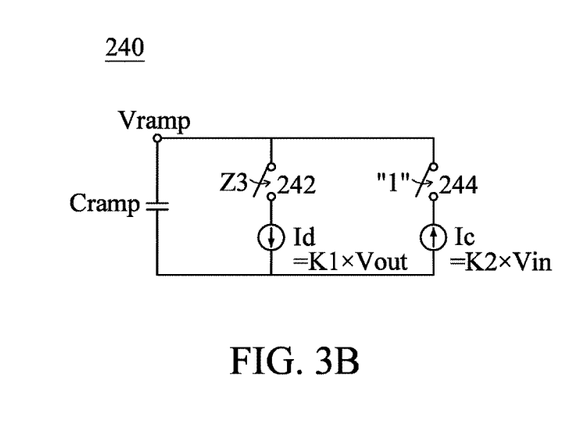
FIG. 3B shows a schematic diagram of a inductor current ramp generator of FIG. 3A.
Figure 3C:
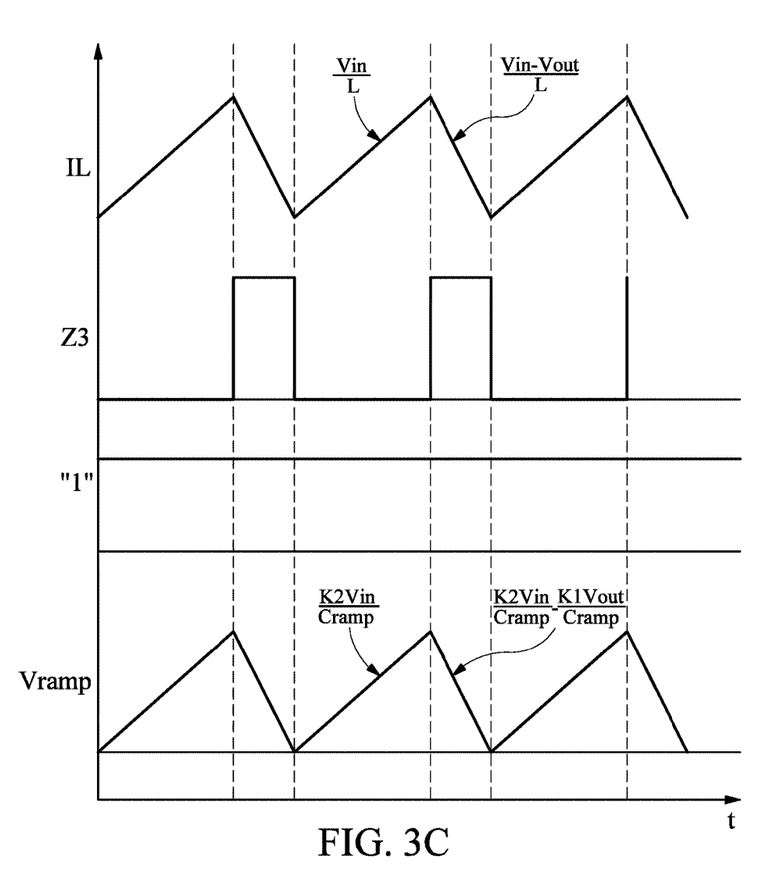
FIG. 3C shows an oscillogram of simulating the inductor current of FIG. 3A.

Reference is made to an oscillogram of the inductor current IL and the ramp signal Vramp in FIG. 3C. When the gate driver 220 drives the power level circuit 210 to charge the inductor L, the inductor current IL flowing through the inductor L increases. At this time, the inductor current ramp generator 240 increases the ramp signal Vramp according to one of the operation signals Z3, Z4 and the input voltage Vin to simulate the inductor current IL. When the gate driver 220 drives the power level circuit 210 to discharge the inductor L, the inductor current IL flowing through the inductor L decreases. At this time, the inductor current ramp generator 240 decreases the ramp signal Vramp according to one of the operation signals Z3, Z4, the input voltage Vin, and the output voltage Vout, to simulate the inductor current IL.

More specifically, as shown in FIGS. 3B and 3C, the inductor current ramp generator 240 includes a discharging switch 242, a charging switch 244, a discharging current source, a charging current source, and a capacitor Cramp. The discharging switch 242 connects in series with the discharging current source. A discharging current Id of the discharging current source is related to the output voltage Vout with a first rate K1, i.e., Id=K1*Vout. The charging switch 244 connects in series with the charging current source. A charging current Ic of the charging current source is related to the input voltage Vin with a second rate K2, i.e., Ic=K2*Vin. The capacitor Cramp is connected in parallel to the discharging current source and the charging current source. The discharging current Id is opposite to the charging current Ic.

When the gate driver 220 drives the power level circuit 210 to charge the inductor L, the inductor current IL increases. At this time, the charging switch 244 maintains conduction according to the high-level, and the discharging switch 242 conducts according to one of the operation signals Z3 and Z4. The charging current source (i.e., the charging current Ic=K2*Vin) charges the capacitor Cramp (i.e., the energy is (K2*Vin)/Cramp) and the discharging current source (i.e., Id=K1*Vout) discharges the capacitor Cramp (i.e., the energy is (K1*Vout)/Cramp) to generate the ramp signal Vramp to the control circuit 230.

It is worth noting that the charging switch 244 can maintain conduction according to a high-level generated by the voltage converter 200 or an external circuit, but is not limited hereto. The discharging switch 242 can be cut off according to one of the operation signal Z3 and Z4. In the present disclosure, the discharging switch 242 conducts according to the operation signal Z3. The operation signals Z3 and Z4 are reverse signals. Therefore, when the discharging switch 242 is cut off according to the operation signal Z4, the discharging switch 242 can reverse the operation signal Z4 to produce the operation signal Z3.

As shown in FIG. 3C, the ramp signal Vramp increases according to the energy of the capacitor Cramp, and the ramp signal Vramp is:

$$Vramp = \frac{(K2 \times Vin)}{Cramp}$$

If the first rate K1 and the second rate K2 match a rate value K (i.e., K=K1=K2) and a reciprocal of the rate value K and a capacitance value of the capacitor Cramp match the inductor current IL (which means that the slope of the ramp signal Vramp is equal to the slope of the inductor current IL), the ramp signal Vramp can be derived as:

$$Vramp = \frac{K}{Cramp}(Vin)$$

In addition, when the gate driver 220 drives the power level circuit 210 to discharge the inductor L, the inductor current IL decreases. At this time, the charging switch 244 maintains conduction according to the high-level, and the discharging switch 242 turns on according to one of the operation signals Z3 and Z4. The charging current source (i.e., Ic=K2*Vin) charges the capacitor Cramp (i.e., the energy is (K2*Vin)/Cramp) and the discharging current source (i.e., Id=K1*Vout) discharges the capacitor Cramp (i.e., the energy is (K1*Vout)/Cramp) to generate the ramp signal Vramp to the control circuit 230.

At this time, the ramp signal Vramp decreases according to the energy of the capacitor Cramp, and the ramp signal Vramp is:

$$Vramp = \frac{(K2 \times Vin)}{Cramp} - \frac{(K1 \times Vout)}{Cramp}$$

If the first rate K1 and the second rate K2 match a rate value K (i.e., K=K1=K2) and a reciprocal of the rate value K and a capacitance value of the capacitor Cramp match the inductor current IL (which means that the slope of the ramp signal Vramp is equal to the slope of the inductor current IL), the ramp signal Vramp can be derived as:

$$Vramp = \frac{K}{Cramp} \times (Vin - Vout)$$

Therefore, when the gate driver 220 drives the power level circuit 210 to charge the inductor L, the inductor current IL increases. The ramp signal Vramp generated from the inductor current ramp generator 240 may simulate an increase of the inductor current IL. When the gate driver 220 drives the power level circuit 210 to discharge the inductor L, the inductor current IL decreases. The ramp signal Vramp generated from the inductor current ramp generator 240 may also simulate a decrease of the inductor current IL.

Accordingly, the voltage converter 200 can simulate the inductor current IL flowing through the inductor L of the power level circuit 210 by the inductor current ramp generator 240, thereby achieving detection of the inductor current by using a non-sensing method.

Figure 4A:
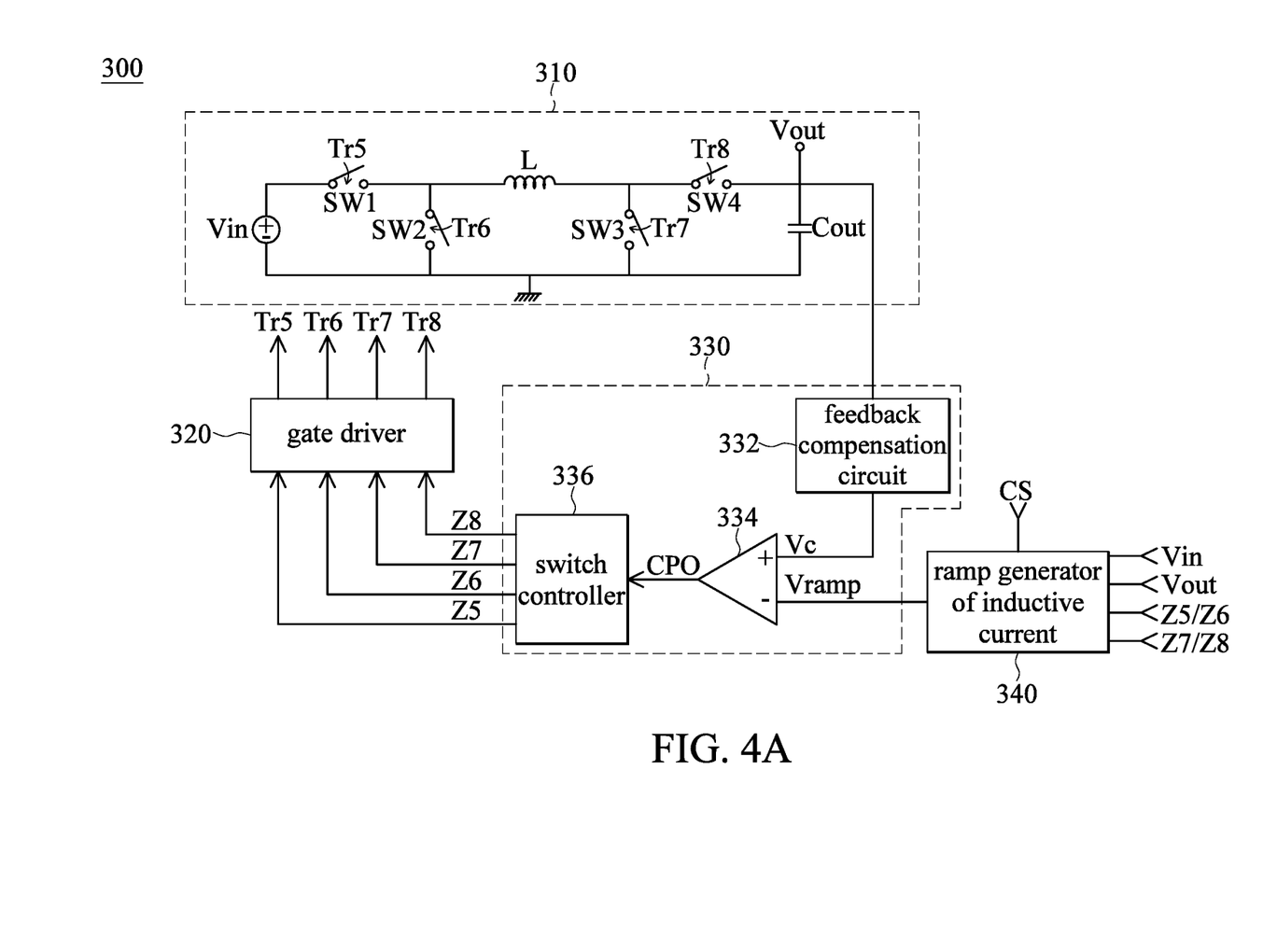
FIG. 4A shows a schematic diagram of a buck-boost converter according to an embodiment of the present disclosure.

In the following embodiment, the voltage converter for simulating inductor current control serves as a buck-boost converter. Referring to FIG. 4A, a schematic diagram of a buck-boost converter according to an embodiment of the present disclosure is shown. As shown in FIG. 4A, a voltage converter 300 is used to convert the input voltage Vin into the output voltage Vout to drive a load (represented by a load capacitor Cout). The voltage converter 300 includes a power level circuit 310, a gate driver 320, a control circuit 330, and a inductor current ramp generator 340. The power level circuit 310 has a first switch SW1, a second switch SW2, a third switch SW3, a fourth switch SW4, and an inductor L. An end of the inductor L is coupled between the first switch SW1 and the second switch SW2 and another end of the inductor L is coupled between the third switch SW3 and the fourth switch SW4. More specifically, the power level circuit 310 of the present disclosure is a power level circuit of a buck-boost converter. Therefore, an end of the first switch SW1 receives the input voltage Vin, another end of the first switch SW1 connects to ground through the second switch SW2, an end of the fourth switch SW4 connects to ground through the third switch SW3, and the inductor L generates the output voltage Vout through another end of the fourth switch SW4.

The gate driver 320 is coupled to the power level circuit 310. The gate driver 320 periodically controls the first switch SW1, the second switch SW2, the third switch SW3, and the fourth switch SW4 according to operation signals Z5, Z6, Z7, and Z8 to charge or discharge the inductor L of the power level circuit 310 in a buck mode or in a boost mode. Then the output voltage Vout is generated by the inductor current IL flowing through the inductor L. More specifically, the gate driver 320 respectively converts the operation signals Z5 to Z8 into the gate driving signals Tr5, Tr6, Tr7, and Tr8 to control the first switch SW1, the second switch SW2, the third switch SW3, and the fourth switch SW4 to be turned-on and turned-off.

For example, the voltage converter 300 operates in the buck mode. The gate driver 320 turns on the first switch SW1 and the fourth switch SW4 and turns off the second switch SW2 and the third switch SW3 according to the operation signals Z5 to Z8 to charge the inductor L. The gate driver 320 turns on the second switch SW2 and the fourth switch SW4 and turns off the first switch SW1 and the third switch SW3 according to the operation signals Z5 to Z8 to discharge the inductor L.

For another example, the voltage converter 300 operates in the boost mode. The gate driver 320 turns on the first switch SW1 and the third switch SW3 and turns off the second switch SW2 and the fourth switch SW4 according to the operation signals Z5 to Z8 to charge the inductor L. The gate driver 320 turns on the first switch SW1 and the fourth switch SW4 and turns off the second switch SW2 and the third switch SW3 according to the operation signals Z5 to Z8 to discharge the inductor L. Persons of ordinary skill in this technology field should realize the operation of the voltage converter 300 in the buck mode or in the boost mode, so that detailed descriptions are omitted herein.

The control circuit 330 is coupled between the power level circuit 310 and the gate driver 320. The control circuit 330 generates a feedback error signal Vc related to the output voltage Vout and generates the operation signals Z5 to Z8 according to the feedback error signal Vc and a ramp signal Vramp related to the inductor current IL. More specifically, the control circuit 330 includes a feedback compensation circuit 332, a comparator 334, and a switch controller 336. The connection relationships and implementations of the feedback compensation circuit 332, the comparator 334, and the switch controller 336 in the control circuit 330 are generally the same as those of the feedback compensation circuit 16a, the comparator 16b, and the switch controller 16c in the conventional control circuit 16, so that detailed descriptions are omitted herein.

A difference between the prior art and the present disclosure is that, in the present disclosure, the ramp signal Vramp related to the inductor current IL is generated by the inductor current ramp generator 340. The inductor current ramp generator 340 is coupled to the control circuit 330 and the power level circuit 310. The inductor current ramp generator 340 receives one of the operation signals Z5 to Z8, the input voltage Vin and the output voltage Vout to simulate the inductor current IL flowing through the inductor L. In the present disclosure, the inductor current ramp generator 340 switches the voltage converter 300 to operate in the buck mode or in the boost mode according to a control signal CS. For example, when the control signal CS is high-level, the inductor current ramp generator 340 determines that the voltage converter 300 currently operates in the buck mode. When the control signal CS is low-level, the inductor current ramp generator 340 determines that the voltage converter 300 currently operates in the boost mode.

Figure 4B:
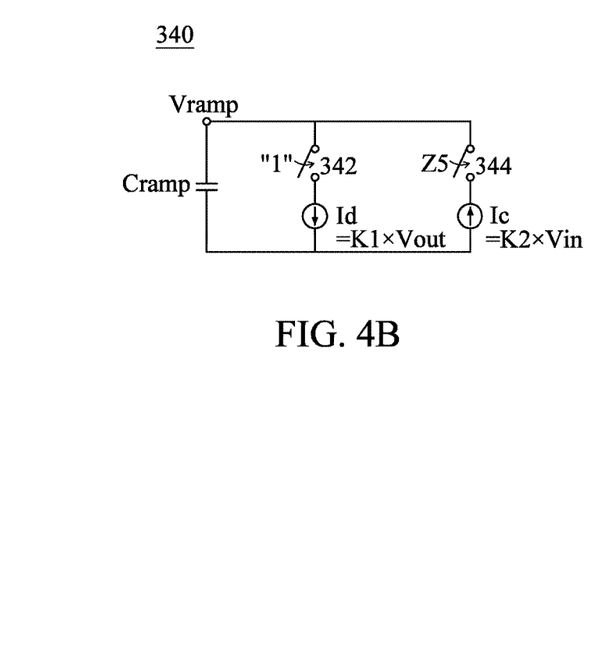
FIG. 4B shows a schematic diagram of a inductor current ramp generator of FIG. 4A in a buck mode.
Figure 4C:
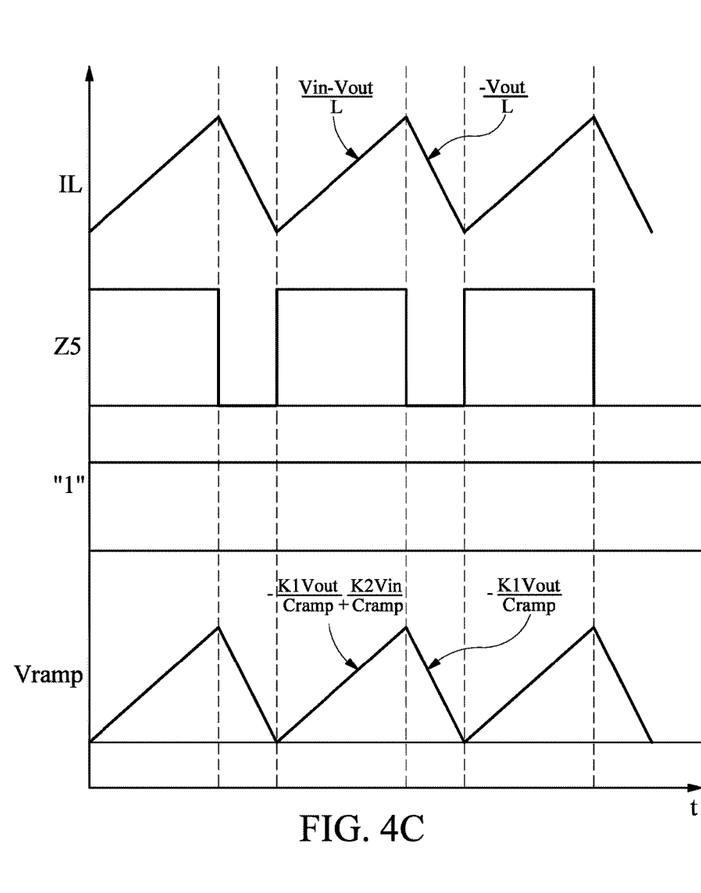
FIG. 4C shows an oscillogram of simulating an inductor current of FIG. 4A in the buck mode.

Referring to FIG. 4C, which shows an oscillogram of the inductor current IL and the ramp signal Vramp. The voltage converter 300 currently operates in the buck mode. When the gate driver 320 drives the power level circuit 310 to charge the inductor L, the inductor current IL flowing through the inductor L increases. At this time, the inductor current ramp generator 340 increases the ramp signal Vramp according to one of the operation signals Z5 and Z6 controlling the first switch SW1 and the second switch SW2, the input voltage Vin, and the output voltage Vout to simulate the inductor current IL. When the gate driver 320 drives the power level circuit 310 to discharge the inductor L, the inductor current IL flowing through the inductor L decreases. At this time, the inductor current ramp generator 340 decreases the ramp signal Vramp according to one of the operation signals Z5 and Z6 controlling the first switch SW1 and the second switch SW2, the input voltage Vin, and the output voltage Vout to simulate the inductor current IL.

More specifically, as shown in FIGS. 4B and 4C, the inductor current ramp generator 340 includes a discharging switch 342, a charging switch 344, a discharging current source, a charging current source, and a capacitor Cramp. The connection relationships and implementations of the discharging switch 342, the charging switch 344, the discharging current source, charging current source, and the capacitor Cramp are generally the same as those of the discharging switch 142, the charging switch 144, the discharging current source, charging current source, and the capacitor Cramp shown in FIG. 2B, so that detailed descriptions are omitted herein.

When the gate driver 320 drives the power level circuit 310 to charge the inductor L in the buck mode, the inductor current IL increases. At this time, the discharging switch 342 maintains conduction according to a high-level, and the charging switch 344 conducts according to one of the operation signals Z5 and Z6. The charging current source (i.e., Ic=K2*Vin) charges the capacitor Cramp (i.e., the energy is (K2*Vin)/Cramp) and the discharging current source (i.e., Id=K1*Vout) discharges the capacitor Cramp (i.e., the energy is (K1*Vout)/Cramp) to generate the ramp signal Vramp to the control circuit 330.

It is worth noting that the discharging switch 342 can maintain conduction according to the high-level generated by the voltage converter 300 or an external circuit, but is not limited hereto. The charging switch 342 can be cut off according to one of the operation signals Z5 and Z6. In the present disclosure, the charging switch 344 conducts according to the operation signal Z5. The operation signals Z5 and Z6 are reverse signals. Therefore, when the charging switch 344 conducts according to the operation signal Z6, the charging switch 344 can reverse the operation signal Z6 to produce the operation signal Z5.

As shown in FIG. 4C, the ramp signal Vramp increases according to the energy of the capacitor Cramp and the ramp signal Vramp is:

$$Vramp = \frac{-(K1 \times Vout)}{Cramp} + \frac{(K2 \times Vin)}{Cramp}$$

If the first rate K1 and the second rate K2 match a rate value K (i.e., K=K1=K2) and a reciprocal of the rate value K and a capacitance value of the capacitor Cramp match the inductor current IL (which means that the slope of the ramp signal Vramp is equal to the slope of the inductor current IL), the ramp signal Vramp can be derived as:

$$Vramp = \frac{K}{Cramp}(Vin - Vout)$$

Furthermore, when the gate driver 320 drives the power level circuit 310 to discharge the inductor L in the buck mode, the inductor current IL decreases. At this time, the discharging switch 342 maintains conduction according to the high-level, and the charging switch 344 cuts off according to one of the operation signals Z5 and Z6. The discharging current source (i.e., Id=K1*Vout) discharges the capacitor Cramp (i.e., the energy is (K1*Vout)/Cramp) to generate the ramp signal Vramp to the control circuit 330.

At this time, the ramp signal Vramp decreases according to the energy of the capacitor Cramp, and the ramp signal Vramp is:

$$Vramp = \frac{-(K1 \times Vout)}{Cramp}$$

If the first rate K1 and the second rate K2 match a rate value K (i.e., K=K1=K2) and a reciprocal of the rate value K and a capacitance value of the capacitor Cramp match the inductor current IL (which means that the slope of the ramp signal Vramp is equal to the slope of the inductor current IL), the ramp signal Vramp can be derived as:

$$Vramp = \frac{-K}{Cramp}(Vout)$$

Therefore, when the gate driver 320 drives the power level circuit 310 to charge the inductor L in the buck mode, the inductor current IL increases. The ramp signal Vramp generated from the inductor current ramp generator 340 can simulate an increase of the inductor current IL. When the gate driver 320 drives the power level circuit 310 to discharge the inductor L in the buck mode, the inductor current IL decreases. The ramp signal Vramp generated from the inductor current ramp generator 340 can also simulate a decrease of the inductor current IL.

Figure 4D:
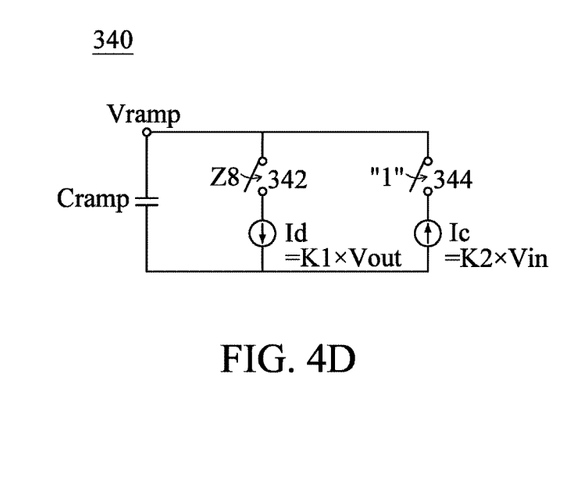
FIG. 4D shows a schematic diagram of the inductor current ramp generator of FIG. 4A in a boost mode.
Figure 4E:
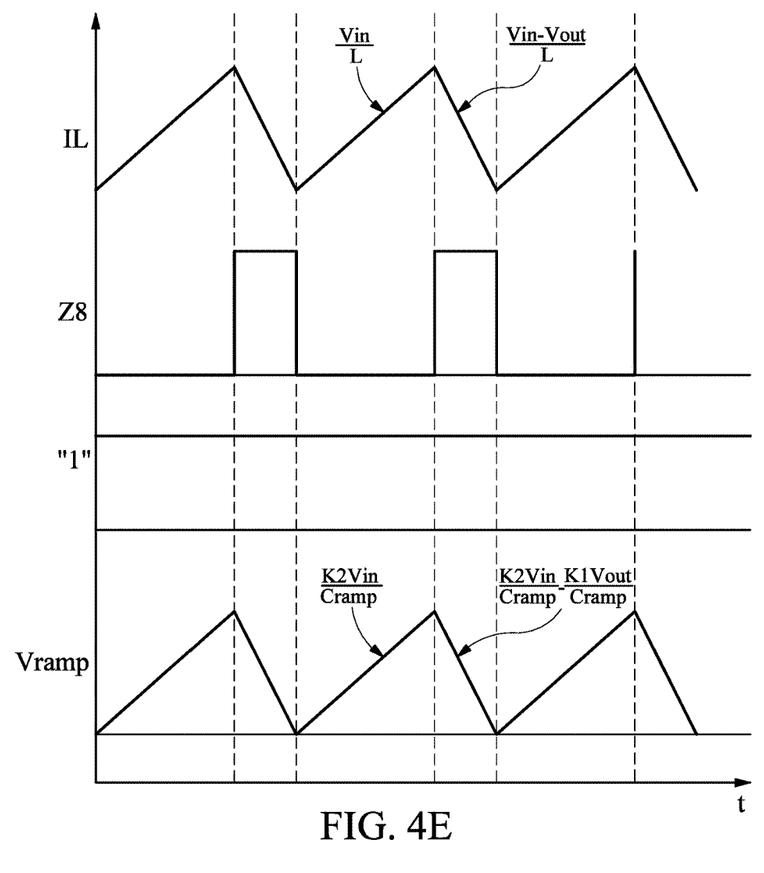
FIG. 4E shows an oscillogram of simulating the inductor current of FIG. 4A in the boost mode.

Reference is made to FIG. 4E, which shows an oscillogram of the inductor current IL and the ramp signal Vramp. The voltage converter 300 currently operates in the boost mode. When the gate driver 320 drives the power level circuit 310 to discharge the inductor L, the inductor current IL flowing through the inductor L decreases. At this time, the inductor current ramp generator 340 decreases the ramp signal Vramp according to one of operation signals Z7 and Z8 controlling the third switch SW3 and the fourth switch SW4, the input voltage Vin, and the output voltage Vout to simulate the inductor current IL. When the gate driver 320 drives the power level circuit 310 to charge the inductor L, the inductor current IL flowing through the inductor L increases. At this time, the inductor current ramp generator 340 increases the ramp signal Vramp according to one of the operation signals Z7 and Z8 controlling the third switch SW3 and the fourth switch SW4, the input voltage Vin, and the output voltage Vout to simulate the inductor current IL.

As shown in FIGS. 4D and 4E, when the gate driver 320 drives the power level circuit 310 to charge the inductor L in the boost mode, the inductor current IL increases. At this time, the charging switch 344 maintains conduction according to a high-level, and the discharging switch 342 cuts off according to one of the operation signals Z7 and Z8. The charging current source (i.e., Ic=K2*Vin) charges the capacitor Cramp (i.e., the energy is (K2*Vin)/Cramp) to generate the ramp signal Vramp to the control circuit 330.

It is worth noting that the charging switch 344 can maintain conduction according to the high-level generated by the voltage converter 300 or external circuit, but is not limited hereto. The discharging switch 342 can be cut off according to one of the operation signal Z7 and Z8. In the present disclosure, the discharging switch 342 is conducted according to the operation signal Z8. The operation signals Z7 and Z8 are reverse signals. Therefore, when the discharging switch 342 is cut off according to the operation signal Z7, the discharging switch 342 can reverse the operation signal Z7 to produce the operation signal Z8.

As shown in FIG. 4E, the ramp signal Vramp increases according to the energy of the capacitor Cramp, and the ramp signal Vramp is:

$$Vramp = \frac{(K2 \times Vin)}{Cramp}$$

If the first rate K1 and the second rate K2 match a rate value K (i.e., K=K1=K2) and a reciprocal of the rate value K and a capacitance value of the capacitor Cramp match the inductor current IL (which means that the slope of the ramp signal Vramp is equal to the slope of the inductor current IL), the ramp signal Vramp can be derived as:

$$Vramp = \frac{K}{Cramp}(Vin)$$

Furthermore, when the gate driver 320 drives the power level circuit 310 to discharge the inductor L in the boost mode, the inductor current IL decreases. At this time, the charging switch 344 maintains conduction according to the high-level, and the discharging switch 342 maintains conduction according to one of the operation signals Z7 and Z8. The charging current source (i.e., Ic=K2*Vin) charges the capacitor Cramp (i.e., the energy is (K2*Vin)/Cramp) and the discharging current source (i.e., Id=K1*Vout) discharges the capacitor Cramp (i.e., the energy is (K1*Vout)/Cramp) to generate the ramp signal Vramp to the control circuit 330.

At this time, the ramp signal Vramp decreases according to the energy of the capacitor Cramp, and the ramp signal Vramp is:

$$Vramp = \frac{(K2 \times Vin)}{Cramp} - \frac{(K1 \times Vout)}{Cramp}$$

If the first rate K1 and the second rate K2 match a rate value K (i.e., K=K1=K2) and a reciprocal of the rate value K and a capacitance value of the capacitor Cramp match the inductor current IL (which means that the slope of the ramp signal Vramp is equal to the slope of the inductor current IL), the ramp signal Vramp can be derived as:

$$Vramp = \frac{K}{Cramp}(Vin - Vout)$$

Therefore, when the gate driver 320 drives the power level circuit 310 to charge the inductor L in the boost mode, the inductor current IL increases. The ramp signal Vramp generated from the inductor current ramp generator 340 can simulate an increase of the inductor current IL. When the gate driver 320 drives the power level circuit 310 to discharge the inductor L in the boost mode, the inductor current IL decreases. The ramp signal Vramp generated from the inductor current ramp generator 340 can also simulate a decrease of the inductor current IL.

Accordingly, the voltage converter 300 can simulate the inductor current IL flowing through the inductor L of the power level circuit 310 by the inductor current ramp generator 340 in the buck mode and in the boost mode, thereby achieving detection of the inductor current by using a non-sensing method.

In summary, the present disclosure provides a voltage converter for simulating inductor current control, which simulates an inductor current of the power level circuit of the voltage converter (e.g., buck converters, the boost converters, buck-boost converters and so on) according to the operation signals generated from the control circuit, the input voltage, and the output voltage, thereby achieving detection of the inductor current by using a non-sensing method. Therefore, the voltage converter of the present disclosure can reduce the use of sensing circuits to reduce associated costs. Therefore, the inductor current ramp generated has no distortion compared to the conventional sensing method and can improve the accuracy of detecting the inductor current. Furthermore, the conventional sensing method may be limited by conditions in actual application (e.g., variations of sensing impedance), causing the accuracy to be decreased. The voltage converter of the present disclosure simulates the inductor current control method and is not limited by conditions in actual application.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being encompassed by the scope of the present disclosure.

What is claimed is:

1. A voltage converter for simulating inductor current control, used to convert an input voltage into an output voltage, and the voltage converter comprising:

a power level circuit having a high-side switch, a low-side switch, and an inductor, wherein the high-side switch is coupled to the low-side switch and the inductor;

a gate driver coupled to the power level circuit, periodically controlling the high-side switch and the low-side switch according to a plurality of operation signals to charge or discharge the inductor, and generating the output voltage according to an inductor current flowing through the inductor;

a control circuit coupled between the power level circuit and the gate driver, generating a feedback error signal related to the output voltage, and generating the operation signals according to the feedback error signal and a ramp signal related to the inductor current; and an inductor current ramp generator coupled to the control circuit and the power level circuit;

wherein when the gate driver drives the power level circuit to charge the inductor, the inductor current ramp generator increases the ramp signal according to one of the operation signals, the input voltage and the output voltage, to simulate the inductor current;

wherein when the gate driver drives the power level circuit to discharge the inductor, the inductor current ramp generator decreases the ramp signal according to one of the operation signals, the input voltage and the output voltage, to simulate the inductor current;

wherein an end of the high-side switch receives the input voltage, another end of the high-side switch is connected to ground through the low-side switch, the inductor is coupled between the high-side switch and the low-side switch, and the output voltage lower than the input voltage is generated by the inductor current, wherein the inductor current ramp generator includes:

a discharging switch connected in series with a discharging current source, wherein a discharging current of the discharging current source is related to the output voltage with a first rate;

a charging switch connected in series with a charging current source, wherein a charging current of the charging current source is related to the input voltage with a second rate; and a capacitor connected in parallel to the discharging current source and the charging current source;

wherein when the gate driver drives the power level circuit to charge the inductor, the discharging switch maintains conduction according to a high-level, the charging switch conducts according to one of the operation signals, the charging current source charges the capacitor and the discharging current source discharges the capacitor to generate the ramp signal;

wherein when the gate driver drives the power level circuit to discharge the inductor, the discharging switch maintains conduction according to the high-level, the charging switch cuts off according to one of the operation signals, and the discharging current source discharges the capacitor to generate the ramp signal.

2. The voltage converter for simulating inductor current control according to claim 1, wherein when the first rate and the second rate match a rate value and a reciprocal of the rate value and a capacitance value of the capacitor match the inductor current, the ramp signal is equal to the inductor current.

3. The voltage converter for simulating inductor current control according to claim 1, wherein when the output voltage generated by the inductor current is higher than the input voltage and the gate driver drives the power level circuit to charge the inductor, the discharging switch maintains conduction according to a high-level, the discharging switch cuts off according to one of the operation signals, and the charging current source charges the capacitor to generate the ramp signal;

when the output voltage generated by the inductor current is higher than the input voltage and the gate driver drives the power level circuit to discharge the inductor, the discharging switch maintains conduction according to the high-level, the discharging switch conducts according to one of the operation signals, the discharging current source discharges the capacitor, and the charging current source charges the capacitor to generate the ramp signal.

4. The voltage converter for simulating inductor current control according to claim 3, wherein when the first rate and the second rate match a rate value and a reciprocal of the rate value and a capacitance value of the capacitor match the inductor current, the ramp signal is equal to the inductor current.

5. A voltage converter for simulating inductor current control, used to convert an input voltage into an output voltage, the voltage converter comprising:

a power level circuit having a first switch, a second switch, a third switch, a fourth switch, and an inductor, wherein an end of the inductor is coupled between the first switch and the second switch and another end of the inductor is coupled between the third switch and the fourth switch;

a gate driver coupled to the power level circuit, periodically controlling the first switch, the second switch, the third switch, and fourth switch according to a plurality of operation signals to charge or discharge the inductor in a buck mode or in a boost mode, and generating the output voltage according to an inductor current flowing through the inductor;

a control circuit coupled between the power level circuit and the gate driver, generating a feedback error signal related to the output voltage, and generating the operation signals according to the feedback error signal and a ramp signal related to the inductor current; and an inductor current ramp generator coupled to the control circuit and the power level circuit;

wherein when the gate driver drives the power level circuit in the buck mode to charge the inductor, the inductor current ramp generator increases the ramp signal according to one of the operation signals controlling the first switch, the second switch, the input voltage and the output voltage, to simulate the inductor current;

wherein when the gate driver drives the power level circuit in the buck mode to discharge the inductor, the inductor current ramp generator decreases the ramp signal according to one of the operation signals controlling the first switch, the second switch, the input voltage and the output voltage, to simulate the inductor current;

wherein when the gate driver drives the power level circuit in the boost mode to discharge the inductor, the inductor current ramp generator decreases the ramp signal according to one of the operation signals controlling the third switch, the fourth switch, the input voltage and the output voltage, to simulate the inductor current;

wherein when the gate driver drives the power level circuit in the boost mode to charge the inductor, the inductor current ramp generator increases the ramp signal according to one of the operation signals controlling the third switch, the fourth switch, the input voltage and the output voltage, to simulate the inductor current;

wherein an end of the first switch receives the input voltage, another end of the first switch connects to ground through the second switch, an end of the fourth switch connects to ground through the third switch, and the inductor generates the output voltage through another end of the fourth switch, wherein the inductor current ramp generator includes:

a discharging switch connected in series with a discharging current source, wherein a discharging current of the discharging current source is related to the output voltage with a first rate;

a charging switch connected in series with a charging current source, wherein a charging current of the charging current source is related to the input voltage with a second rate; and a capacitor connected in parallel to the discharging current source and the charging current source;

wherein when the gate driver drives the power level circuit to charge the inductor in the buck mode, the discharging switch maintains conduction according to a high-level, the charging switch conducts according to one of the operation signals controlling the first switch and the second switch, the charging current source charges the capacitor and the discharging current source discharges the capacitor to generate the ramp signal;

wherein when the gate driver drives the power level circuit to discharge the inductor in the buck mode, the discharging switch maintains conduction according to the high-level, the charging switch cuts off according to one of the operation signals controlling the first switch and the second switch, and the discharging current source discharges the capacitor to generate the ramp signal.

6. The voltage converter for simulating inductor current control according to claim 5, wherein when the first rate and the second rate match a rate value and a reciprocal of the rate value and a capacitance value of the capacitor match the inductor current, the ramp signal is equal to the inductor current.

7. The voltage converter for simulating inductor current control according to claim 5, wherein when the gate driver drives the power level circuit to charge the inductor in the boost mode, the charging switch maintains conduction according to a high-level, the discharging switch cuts off according to one of the operation signals controlling the third switch and the fourth switch, and the charging current source charges the capacitor to generate the ramp signal;

wherein when the gate driver drives the power level circuit to discharge the inductor in the boost mode, the charging switch maintains conduction according to the high-level, the discharging switch conducts according to one of the operation signals controlling the third switch and the fourth switch, the charging current source charges the capacitor and the discharging current source discharges the capacitor to generate the ramp signal.

8. The voltage converter for simulating inductor current control according to claim 7, wherein when the first rate and the second rate match a rate value and a reciprocal of the rate value and a capacitance value of the capacitor match the inductor current, the ramp signal is equal to the inductor current.

* * * * *